US009394029B2

(12) United States Patent
Tsai

(10) Patent No.: US 9,394,029 B2
(45) Date of Patent: Jul. 19, 2016

(54) BICYCLE DISC BRAKE APPARATUS

(71) Applicant: Tektro Technology Corporation, Changhua (TW)

(72) Inventor: Szu-Fang Tsai, Changhua (TW)

(*) Notice: Subject to any disclaimer, the term of this patent is extended or adjusted under 35 U.S.C. 154(b) by 0 days.

(21) Appl. No.: 13/864,275

(22) Filed: Apr. 17, 2013

(65) Prior Publication Data
US 2014/0224595 A1 Aug. 14, 2014

(30) Foreign Application Priority Data

Feb. 8, 2013 (TW) .............................. 102203124 U

(51) Int. Cl.
*F16D 55/228* (2006.01)
*B62L 1/00* (2006.01)
*B62L 3/02* (2006.01)
*F16D 121/14* (2012.01)
*F16D 125/36* (2012.01)

(52) U.S. Cl.
CPC . *B62L 1/005* (2013.01); *B62L 3/02* (2013.01); *F16D 55/228* (2013.01); *F16D 2121/14* (2013.01); *F16D 2125/36* (2013.01)

(58) Field of Classification Search
CPC F16D 55/228; F16D 2121/14; F16D 2125/36
USPC ............ 188/24.11, 26, 72.3, 216, 72.7, 72.8, 188/72.9
See application file for complete search history.

(56) References Cited

U.S. PATENT DOCUMENTS

| | | | | | |
|---|---|---|---|---|---|
| 3,003,589 | A | * | 10/1961 | Desbrow ...................... | 188/72.3 |
| 3,182,755 | A | * | 5/1965 | Tullio .......................... | 188/72.7 |
| 3,442,354 | A | * | 5/1969 | Belart ........................... | 188/71.9 |
| 3,765,511 | A | * | 10/1973 | Toyomasu ..................... | 188/26 |
| 3,894,618 | A | * | 7/1975 | Enright ......................... | 188/26 |
| 3,989,124 | A | * | 11/1976 | Fujii .............................. | 188/26 |
| 4,061,206 | A | * | 12/1977 | Wood ............................ | 188/26 |
| 4,454,933 | A | * | 6/1984 | Hunnicutt et al. ........... | 188/71.9 |
| 5,979,609 | A | * | 11/1999 | Tsai .............................. | 188/26 |

FOREIGN PATENT DOCUMENTS

DE 29914327 U1 * 12/1999
EP 542134 A1 * 5/1993

* cited by examiner

*Primary Examiner* — Thomas J Williams

(57) ABSTRACT

The present invention provides a bicycle disc brake apparatus comprising a U-shape elastic plate having two ends connected to two ring portions; the ring portions comprising through holes; the U-shape elastic plate comprising two brake pads abutting the ring portions; two compression discs outside the U-shape elastic plate and adjacent to the ring portions, comprising protrusions penetrating the through holes to act on the brake pads, compression disc rotating slots away from the protrusions and first guiding tread surface in a first direction; two roller seats adjacent to the compression discs and comprising roller rotating slots adjacent to the compression disc rotating slots; rollers provided between the rotating slots; the roller rotating slots having second guiding tread surface in a second direction opposite to the first direction with protruding columns; two bearings mounted on the protruding columns; and two sealing gaskets sealed onto the bearings away from the roller seats.

4 Claims, 6 Drawing Sheets

BICYCLE DISC BRAKE APPARATUS

(a) TECHNICAL FIELD OF THE INVENTION

The present invention is related to a brake apparatus, in particular, to a bicycle disc brake apparatus.

(b) DESCRIPTION OF THE PRIOR ART

For currently known disc brake apparatus, they can be mainly categorized, in terms of their actuation methods, into two systems of mechanical braking system and hydraulic braking system. In which, the structure of a mechanical disc brake caliper is relatively simpler with a lower manufacturing cost and is, therefore, more suitable to conventional bicycles or related fitness equipment.

Despite the fact that currently known mechanical disc brake calipers are sufficient in achieving the effect of braking operation, during their uses in practice, there are still a great number of problems and shortcomings associated with known disc brake calipers.

In the design of currently known disc brake calipers, the brake pad is directly and closely abutting the end surface of the brake push rod; and during the braking operation thereof, the brake push rod pushes the brake pad to be in contact with the brake disc in order to achieve the braking effect with frictions generated therebetween. However, in the situation where the brake disc and the brake pad are not precisely positioned to be in parallel with each other during the installation thereof, the brake pad would then fail to obtain a complete contact with the brake disc during the braking operation, which is likely to cause an insufficient partial friction therebetween; as a result, not only the outcome of the braking is poor but also the occurrence of the problem associated with the damages at the brake pad due to such unfavorable partial friction.

In addition, the currently known disc brake apparatus provides spring only on one end of a single brake pad to achieve the control of the returning operation of the brake pad. Nevertheless, since the force is only being exerted on one single side only, unbalanced exertion of the force would likely occur to affect the braking efficiency of the brake; furthermore, the difference in the material compositions used on the two sides of the brake pad is likely to pose difficulties in the assembly of the parts; and since the materials are different, the cost thereof is also higher.

SUMMARY OF THE INVENTION

In view of the above, an objective of the present invention is to provide a bicycle disc brake apparatus capable of overcoming the aforementioned drawbacks and utilizes a U-shape elastic plate to act on two sides for controlling two brake pads in order to achieve a uniform force exertion and such that the overall structure thereof is simplified to facilitate the operation and to lower the manufacturing costs of the bicycle disc bake.

To achieve the aforementioned objective, the present invention provides a bicycle disc brake apparatus comprising: a U-shape elastic plate comprising a connection portion having two ends connected to two ring portions thereof respectively; each one of the ring portions having a through hole formed thereon; two brake pads provided in an internal of the U-shape elastic plate and spaced apart from each other; wherein each one of the brake pads abuts each one of the ring portions respectively; two compression discs arranged at an external of the U-shape elastic plate and adjacent to each one of the ring portions of the U-shape elastic plate; each one of the compression discs comprising a protrusion penetrating through the through hole of each one of the ring portions for acting on each one of the brake pads correspondingly; wherein each one of the compression discs comprises a plurality of compression disc rotating slots provided on one side of the compression disc away from the protrusion and arranged spaced apart from each other, and each one of the compression disc rotating slots comprises a first guiding tread surface facing toward a first direction; two roller seats arranged adjacent to each one of the compression discs; each one of the roller seats comprising a plurality of roller rotating slots corresponding to the plurality of compression disc rotating slots in number and provided on one side of the roller seats adjacent to the compression discs; a roller provided between each one of the roller rotating slots and each one of the compression disc rotating slots; wherein each one of the roller rotating slots comprises a second guiding tread surface facing toward a second direction opposite from the first direction, and each one of the roller seats comprises a protruding column arranged axially on one side of each one of the roller seats away from each one of the compression discs correspondingly; two bearings having a ring shape, mounted on the protruding column of each one of the roller seats respectively and abutting a surface of one side of each one of the roller seats away from the roller rotating slots; and two sealing gaskets inserted into each one of the bearings respectively on one side of the bearings away from the roller seats correspondingly.

The aforementioned bicycle disc brake apparatus further comprises a brake main body having a receiving slot and an elongated hole; wherein the U-shape elastic plate penetrates through the elongated hole, and the compression discs, the roller seats, the bearings and the sealing gaskets are received in an internal of the receiving slot.

According to the aforementioned bicycle disc brake apparatus, wherein the connection portion comprises an opening perforation, each one of the brake pads comprises a protruding slat penetrating through the opening perforation of the connection portion, and the protruding slat of each one of the brake pads comprises a connection hole; and wherein the brake main body comprises a connection rod penetrating through each one of the connection holes provided thereon such that each one of the connection holes is moveably mounted onto the connection rod.

According to the aforementioned bicycle disc brake apparatus, wherein the compression discs are configured to allow rotational and horizontal adjustments with a tool passing through a hollow portion of the roller seats.

According to the aforementioned bicycle disc brake apparatus, wherein a circumference of each one of the roller seats is of a radius greater than a radius of each one of the ring portions of the U-shape elastic plate.

DETAILED DESCRIPTION OF THE PREFERRED EMBODIMENTS

Figure 1:
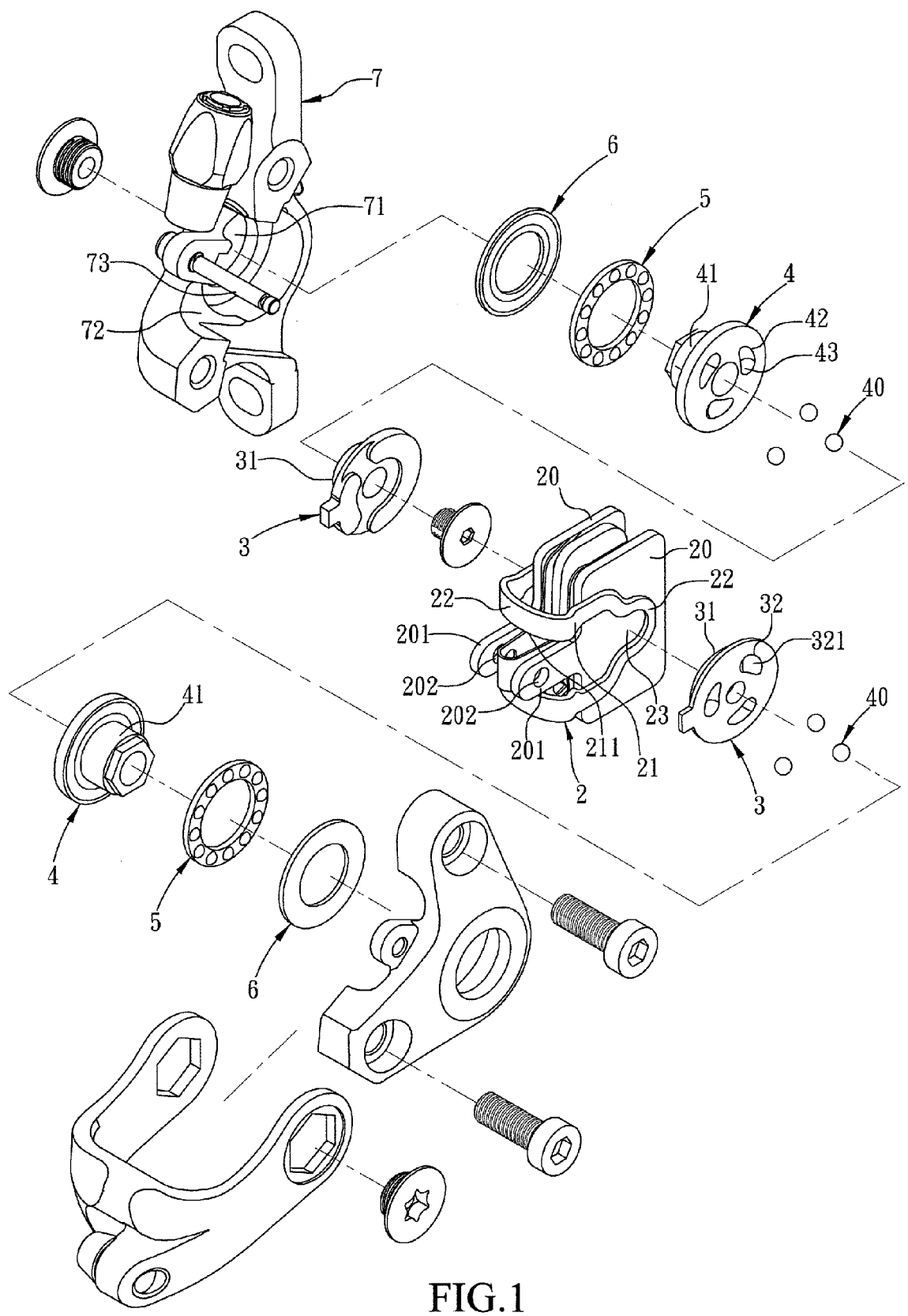
FIG. 1 is an exploded view of the bicycle disc brake apparatus of the present invention.
Figure 2:
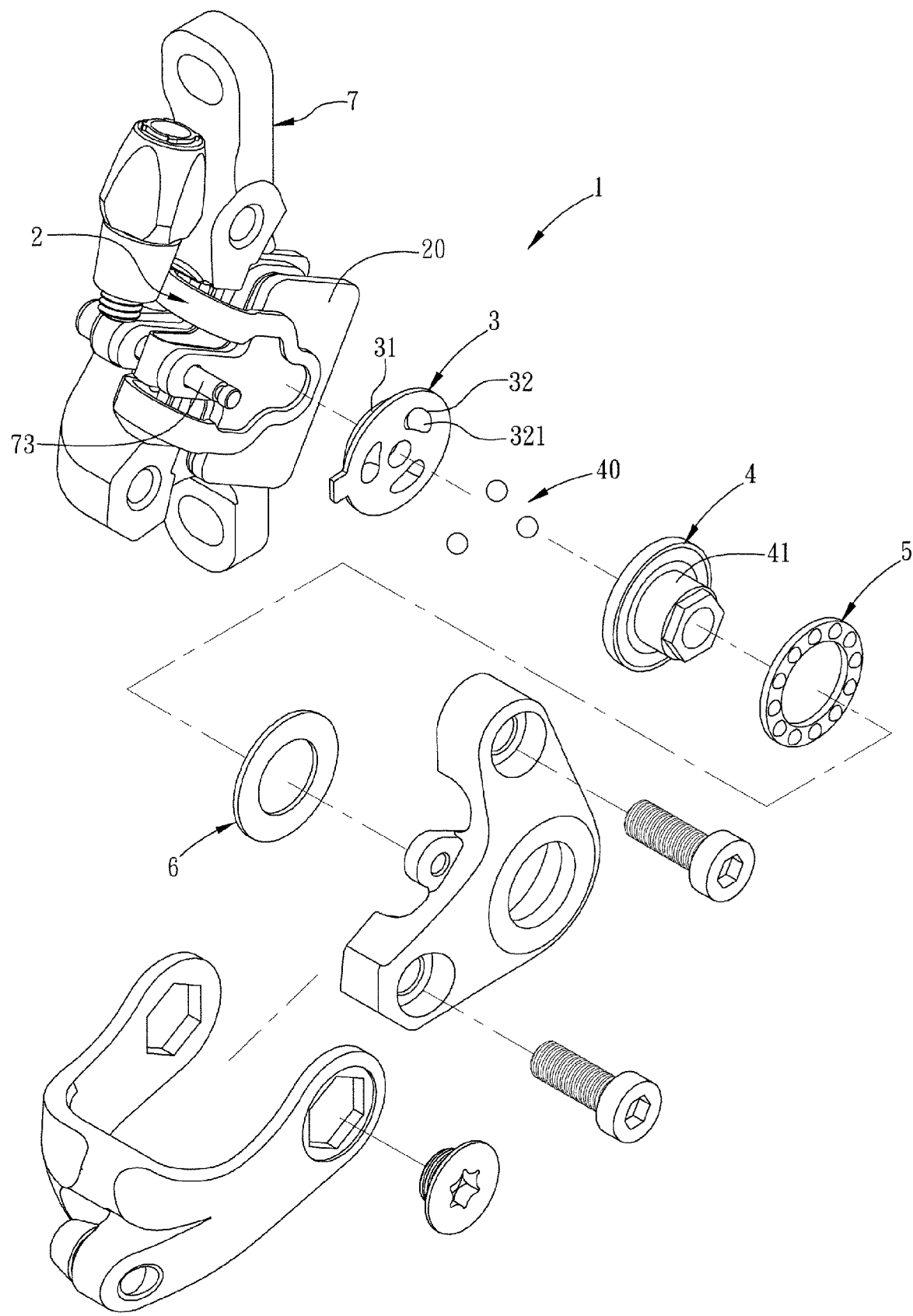
FIG. 2 is a partial exploded view of components of the bicycle disc brake apparatus of the present invention.
Figure 3:
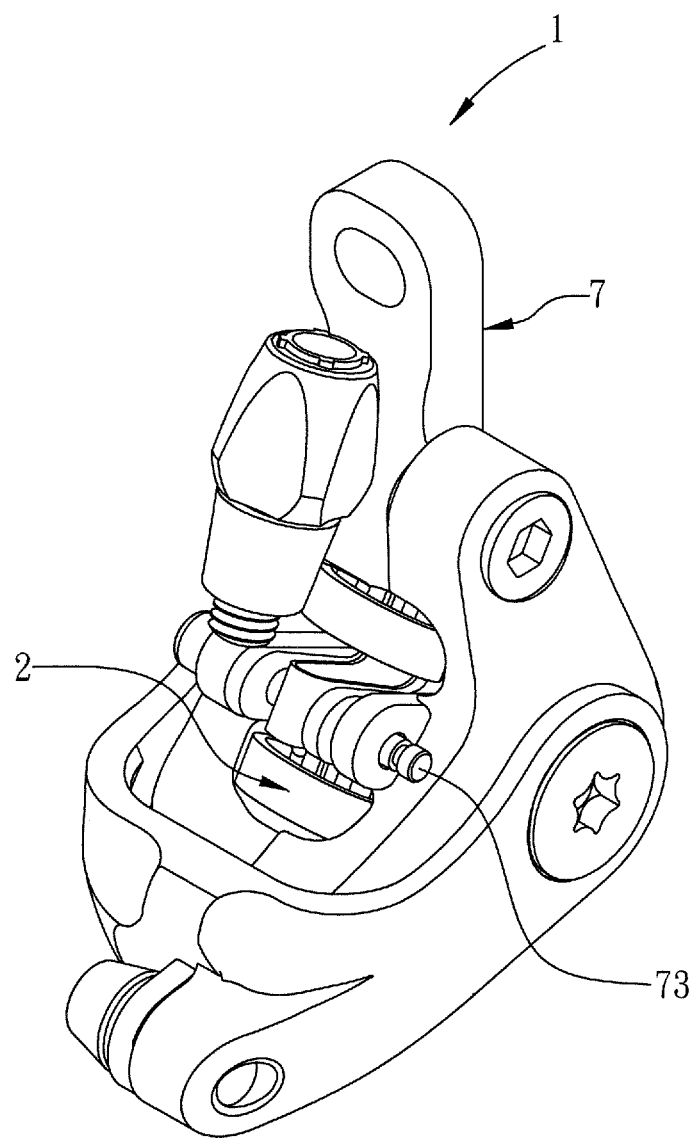
FIG. 3 is a perspective view showing the outer appearance of the bicycle disc brake apparatus of the present invention.
Figure 4:
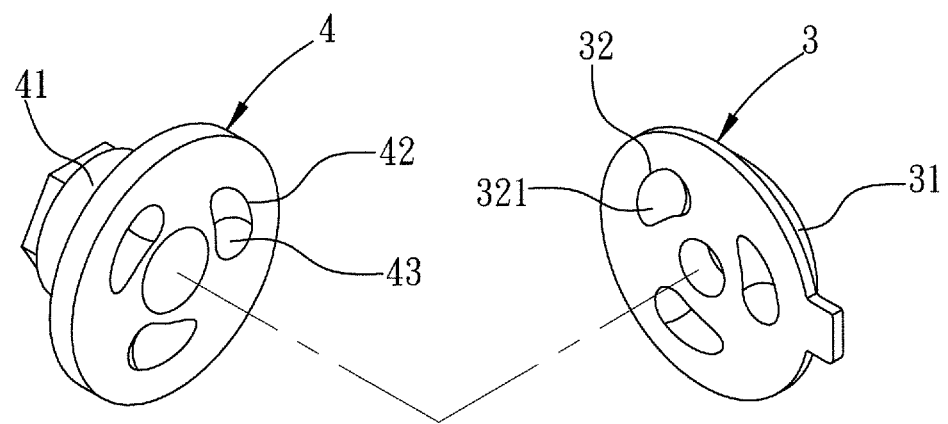
FIG. 4 is an exploded view of the compression discs and the roller seats of the bicycle disc brake apparatus of the present invention.
Figure 5:
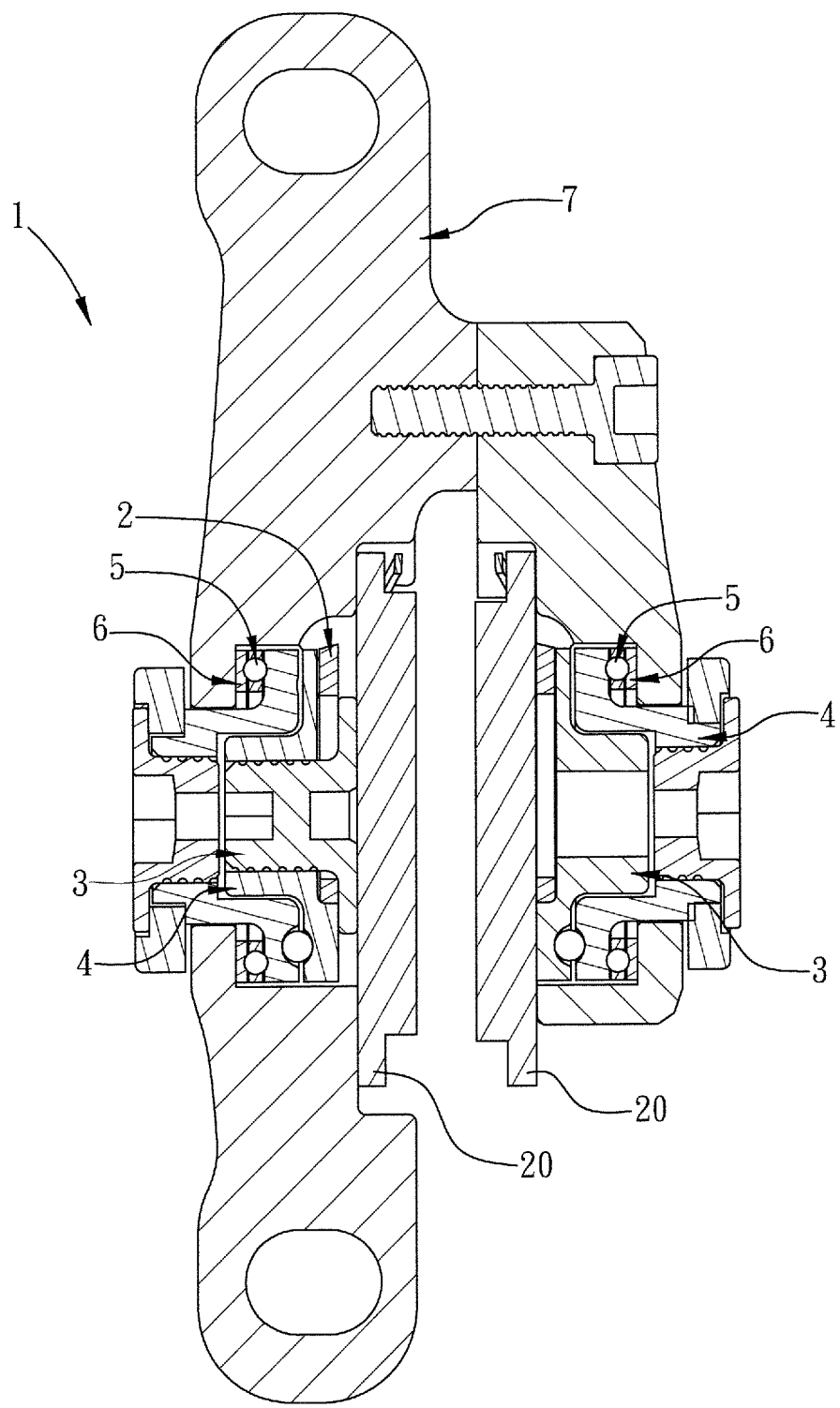
FIG. 5 is a cross sectional view of the bicycle disc brake apparatus of the present invention.
Figure 6:
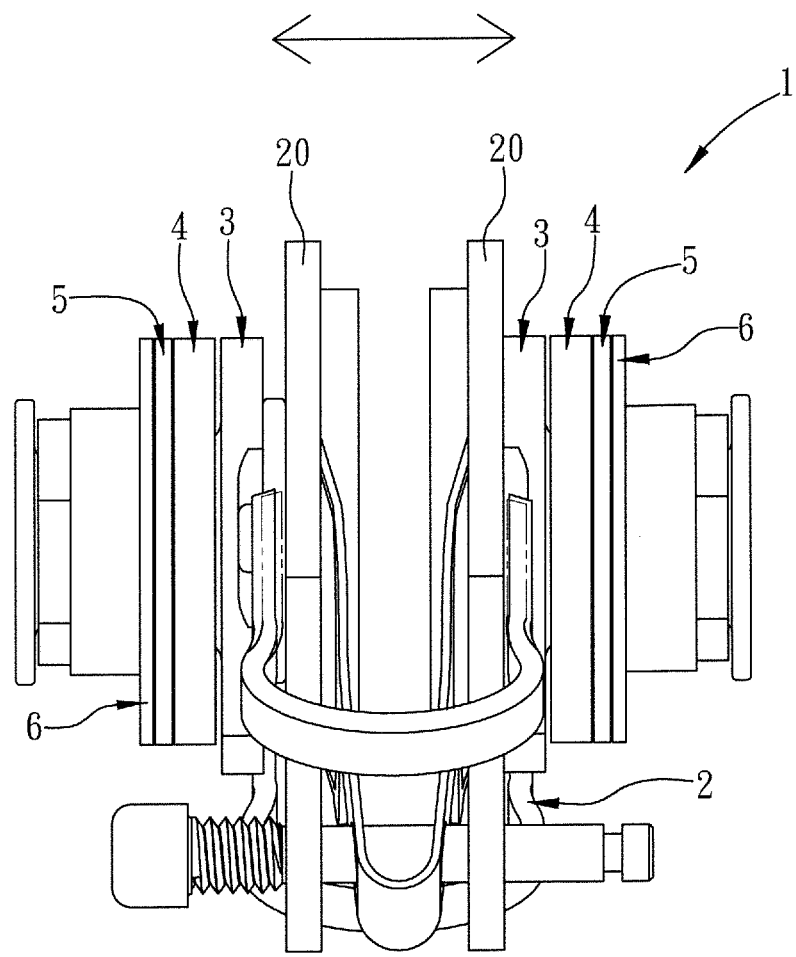
FIG. 6 is an illustration showing the bicycle disc brake apparatus of the present invention in braking operation and actions.

The present invention provides a bicycle disc brake apparatus 1 comprising a U-shape elastic plate 2, two compression discs 3, two roller seats 4, two bearings 5 and two sealing gaskets 6.

The U-shape elastic plate 2 comprises a connection portion 21 and two ring portions 22. The connection portion 21 includes two ends connected to the two ring portions 22 respectively. Each one of the ring portions 22 includes a through hole 23 formed thereon. Two brake pads 20 are provided in an internal of the U-shape elastic plate 2 and are spaced apart from each other. Each one of the brake pads 20 abuts each one of the ring portions 22 respectively.

The two compression discs 3 are arranged at an external of the U-shape elastic plate 2 and adjacent to each one of the ring portions 22 of the U-shape elastic plate 2. Each one of the compression discs 3 comprises a protrusion 31 penetrating through the through hole 23 of each one of the ring portions 22 for acting on each one of the brake pads 20 correspondingly. Each one of the compression discs 3 comprises a plurality of compression disc rotating slots 32 provided on one side of the compression disc 3 away from the protrusion 31 and arranged spaced apart from each other, and each one of the compression disc rotating slots 32 comprises a first guiding tread surface 321 facing toward a first direction. The first direction can be either a clockwise direction or a counterclockwise direction; and the present invention uses the counterclockwise direction as an example and for illustration purposes only.

The two roller seats 4 are arranged adjacent to each one of the compression discs 3. Each one of the roller seats 4 comprises a plurality of roller rotating slots 42 corresponding to the plurality of compression disc rotating slots 32 in number and provided on one side of the roller seats 4 adjacent to the compression discs 3. A roller 40 is provided between each one of the roller rotating slots 42 and each one of the compression disc rotating slots 32. Each one of the roller rotating slots 42 comprises a second guiding tread surface 43 facing toward a second direction (such as a clockwise direction) opposite from the first direction. Each one of the roller seats 4 comprises a protruding column 41 arranged axially on one side of each one of the roller seats 4 away from each one of the compression discs 3 correspondingly. According to the embodiment of the present invention, a circumference of each one of the roller seats 42 is of a radius greater than a radius of each one of said ring portions 22 of said U-shape elastic plate 2 such that the compression discs 3 are able to exert forces uniformly on the ring portions 22 of the U-shape elastic plate in order to prevent the occurrence of unbalanced exertion of forces of the U-shape elastic plate on the ring portions 22, which may unfavorably lead to the elastic fatigue of the U-shape elastic plate as well as unequal separation distance between the brad pads 20 and eventually causes the outcome of the braking to be poor after a significant period of usage time In addition, according to the embodiment of the present invention, the compression discs 3 are configured to allow rotational and horizontal adjustments with a tool (not shown in the figures) passing through a hollow portion of said roller seats 4.

The two bearings 5 are of a ring shape and can be roller bearings but are not limited to such shape and such type of bearing. Each one of bearings 5 is mounted on the protruding column 41 of each one of the roller seats 4 respectively and abutting a surface of one side of each one of the roller seats 4 away from the roller rotating slots 42.

The two sealing gaskets 6 are inserted into each one of the bearings 5 respectively on one side of the bearings 5 away from the roller seats 4 correspondingly.

Furthermore, the bicycle disc brake apparatus of the present invention further comprises a brake main body 7 having a receiving slot 71 and an elongated hole 72. The U-shape elastic plate 2 penetrates through the elongated hole 72, and the compression discs 3, the roller seats 4, the bearings 5 and the sealing gaskets 6 are received in an internal of the receiving slot 71.

In addition, according to the embodiment of the bicycle disc brake apparatus of the present invention, the connection portion 21 comprises an opening perforation 211, and each one of the brake pads 20 comprises a protruding slat 201 penetrating through the opening perforation 211 of the connection portion 21. Furthermore, the protruding slat 201 of each one of the brake pads 20 comprises a connection hole 202. The brake main body 7 comprises a connection rod 73 penetrating through each one of the connection holes 202 provided thereon such that each one of the connection holes 202 is moveably mounted onto the connection rod 73.

With the aforementioned structure of the bicycle disc brake apparatus of the present invention, the interactions among the roller rotating slots 42, rollers 40 and compression disc slots 32 are able to force the protrusion 31 of each one of the compression discs 2 to push the two brake pads 20 to clamp firmly onto the disc (not shown in the figures) in order to achieve the braking operation and effect. Furthermore, the elastic force (returning force) of the U-shape elastic plate 2 is able to push the two compression discs 3 back to its original position along with the interactions among the roller rotating slots 42, rollers 49 and compression disc rotating slots 32 such that the two brake pads 20 can be separated apart from each other to achieve the release of the brake.

Additionally and accordingly, since the U-shape elastic plate 2 is able to provide a two-sided action and operation while using two sets of identical materials in the structure thereof, the merits of having an improved disc brake apparatus with a uniform exertion of forces and with a simplified structure as well as facilitated operations can be advantageously achieved.

What is claimed is:

1. A bicycle disc brake apparatus, comprising:
a U-shape elastic plate comprising a connection portion having two ends connected to two ring portions thereof respectively; each one of said ring portions having a through hole formed thereon; two brake pads provided in an internal of said U-shape elastic plate and spaced apart from each other; wherein each one of said brake pads abuts each one of said ring portions respectively;
two compression discs arranged at an external of said U-shape elastic plate and adjacent to each one of said ring portions of said U-shape elastic plate;
each one of said compression discs comprising a protrusion penetrating through said through hole of each one of said ring portions for acting on each one of said brake pads correspondingly; wherein each one of said compression discs comprises a plurality of compression disc rotating slots provided on one side of the compression disc away from said protrusion and arranged spaced apart from each other, and each one of said compression disc rotating slots comprises a first guiding tread surface facing toward a first direction;

two roller seats arranged adjacent to each one of said compression discs; each one of said roller seats comprising a plurality of roller rotating slots corresponding to said plurality of compression disc rotating slots in number and provided on one side of said roller seats adjacent to said compression discs; a roller provided between each one of said roller rotating slots and each one of said compression disc rotating slots; wherein each one of said roller rotating slots comprises a second guiding tread surface facing toward a second direction opposite from said first direction, and each one of said roller seats comprises a protruding column arranged axially on one side of each one of said roller seats away from each one of said compression discs correspondingly;

two bearings having a ring shape, mounted on said protruding column of each one of said roller seats respectively and abutting a surface of one side of each one of said roller seats away from said roller rotating slots;

two sealing gaskets placed onto each one of said bearings respectively on one side of said bearings away from roller seats correspondingly; and a brake main body, having a receiving slot and an elongated hole; wherein said U-shape elastic plate penetrates through said elongated hole, and said compression discs, said roller seats, said bearings and said sealing gaskets are received in an internal of said receiving slot.

2. The bicycle disc brake apparatus according to claim 1, wherein said connection portion comprises an opening perforation, each one of said brake pads comprises a protruding slat penetrating through said opening perforation of said connection portion, and said protruding slat of each one of said brake pads comprises a connection hole; and wherein said brake main body comprises a connection rod penetrating through each one of said connection holes provided thereon such that each one of said connection holes is moveably mounted onto said connection rod.

3. The bicycle disc brake apparatus according to claim 1, wherein said compression discs are configured to allow rotational and horizontal adjustments with a tool passing through a hollow portion of said roller seats.

4. The bicycle disc brake apparatus according to claim 1, wherein a circumference of each one of said roller seats is of a radius greater than a radius of each one of said ring portions of said U-shape elastic plate.

* * * * *